United States Patent
Kimura et al.

[11] 3,898,006
[45] Aug. 5, 1975

[54] EXPOSURE LAMP CONTROL DEVICE

[75] Inventors: Yoshimasa Kimura, Kawasaki; Hisashi Sakamaki, Yokohama; Toshio Honma, Kawasaki, all of Japan

[73] Assignee: Canon Kabushiki Kaisha, Tokyo, Japan

[22] Filed: Aug. 27, 1974

[21] Appl. No.: 501,090

[30] Foreign Application Priority Data
Sept. 3, 1973 Japan.................... 48-99502

[52] U.S. Cl. ............... 355/69; 314/135; 315/289
[51] Int. Cl.² ............... G03B 27/76; H05B 37/00; H05B 39/00; H05B 41/14
[58] Field of Search ............ 355/69, 4; 314/135; 315/246, 289

[56] References Cited
UNITED STATES PATENTS

| | | | |
|---|---|---|---|
| 3,609,038 | 9/1971 | Koishorn.................... | 355/69 X |
| 3,692,408 | 9/1972 | Nakamura.................... | 355/69 |
| 3,732,011 | 5/1973 | Hansard.................... | 355/69 X |
| 3,742,295 | 6/1973 | Irie.................... | 355/69 X |
| 3,795,444 | 3/1974 | Glidden et al.................... | 355/69 X |
| 3,815,992 | 6/1974 | Ogawa.................... | 355/69 |

*Primary Examiner*—Richard A. Wintercorn
*Attorney, Agent, or Firm*—Fitzpatrick, Cella, Harper & Scinto

[57] ABSTRACT

A device for controlling an exposure lamp for projecting an original image by changing pulse repetition rate or pulse width which activates the lamp. There are included a pulse oscillator, a pulse width controlling circuit, and a switching circuit. The pulse oscillator includes a plurality of pulse repetition rate setting circuits corresponding to the number of desired color separations. The pulse width controlling circuit includes a plurality of pulse width setting circuits corresponding to the number of desired color separations. The pulse repetition rate of the pulse oscillator or the pulse width of the pulse controlling circuit may be set to a desired value depending upon a desired separation negative.

4 Claims, 8 Drawing Figures

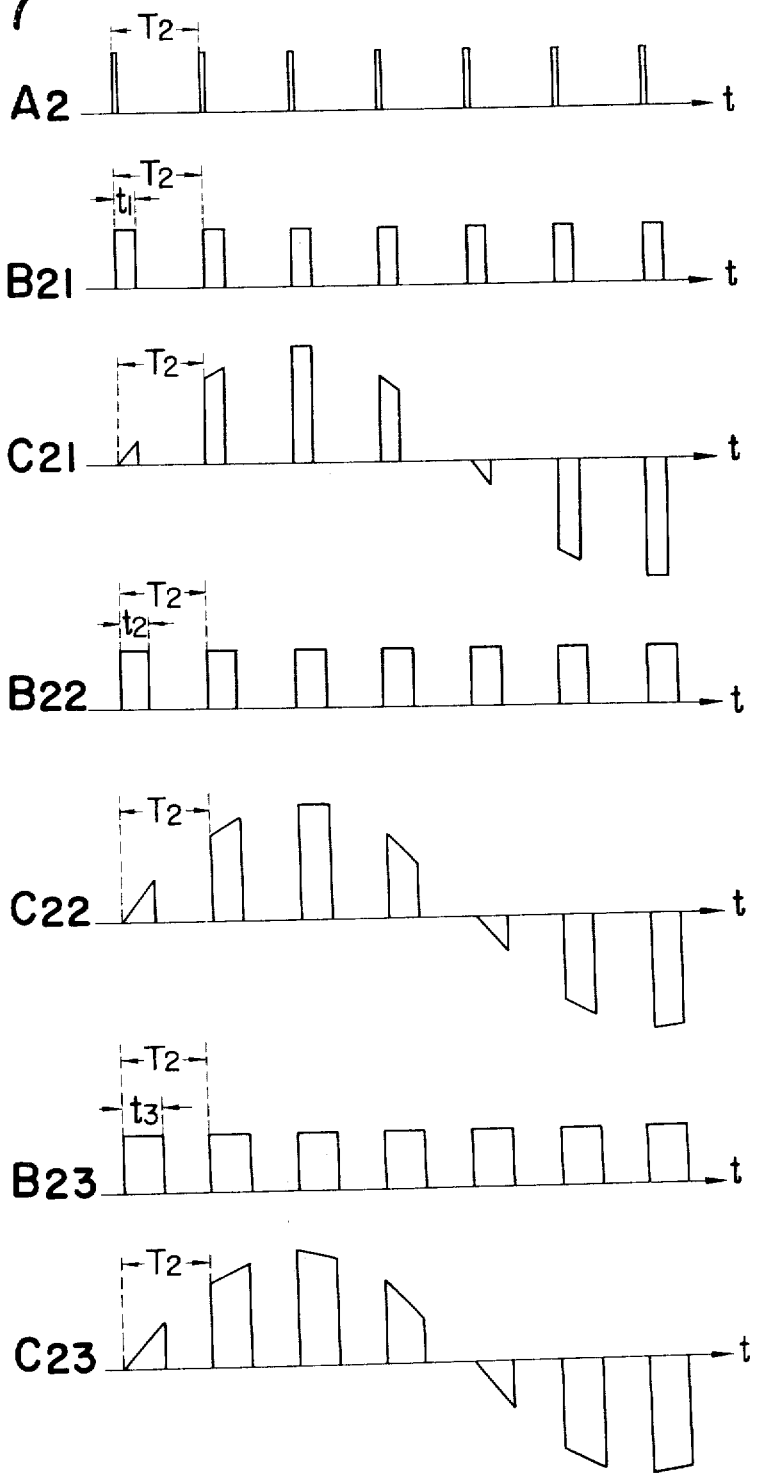

EXPOSURE LAMP CONTROL DEVICE

BACKGROUND OF THE INVENTION

1. Field of the Invention

The present invention relates to generally an exposure lamp control device for use with a copying machine and more particularly an exposure lamp control device capable of the optimum control of the on-off operation of an exposure lamp or lamps so as to ensure the excellent reproduction in color.

2. Description of the Prior Art

There have been proposed various types of devices for controlling the brightness of an exposure lamp, but they control the brightness only depending upon the overall tone of an original. However, in color reproduction, the optimum exposure is different for each separation negative. Furthermore a proper color balance must be attained among a set of separations so that the image with a proper color balance may be reproduced. Thus, an exposure lamp control device for use in color reproduction must not only provide the optimum exposure for each separation negative but also attain a proper balance among a set of separations. In the prior art exposure control device disclosed, for instance, in U.S. Pat. No. 3,467,468, by S. W. Johnson, filed Mar. 30, 1967 and patented Sept. 16, 1969, an exposure time is regulated for each separation. The control system of the type described is effective only when an original is placed stationary with respect to a sensitive member and the whole original is projected thereupon at one exposure, but is not effective when the original is moved relative to the sensitive member or drum and exposed or projected through a slit. Therefore, in the slit exposure type copying machines, the brightness of an exposure lamp or lamps must be controlled instead of the exposure time. The brightness of an exposure lamp or lamps may be regulated by regulating the voltage impressed across the exposure lamps by use of a slide-wire rheostat or by a phase control circuit consisting of a slide-wire rheostat and a semiconductor switching element such as a silicon controlled rectifier or triac. However, the above system has the defects that the device is large in size and complex in construction and that the power consumption is increased.

SUMMARY OF THE INVENTION

One of the objects of the present invention is therefore to provide an exposure lamp control device best adapted for use with an exposure or projection system in which an original is scanned through a slit.

Another object of the present invention is to provide an exposure lamp control device best adapted for use in color reproduction, ensuring the optimum exposure for each separation negative and the optimum color balance among a set of separations.

A further object of the present invention is to provide an exposure lamp control device simple in construction, compact in size and with less power consumption.

Briefly stated, to attain the above and other objects, the present invention provides a device for controlling or regulating an exposure lamp or lamps for exposing an original to be reproduced, said device comprising pulse generating means whose pulse repetition rate may be variable, pulse-width control means for changing the pulse width of the output pulses of the pulse generating means for each separation negative, and switching means adapted to be turned on and off in response to the output pulses from said pulse width control or changing means, thereby regulating the on-off operation of an exposure lamp or lamps, the latter being kept turned on for a time interval equal to the pulse width.

The above and other objects, features and advantages of the present invention will become more apparent from the following description of preferred embodiments thereof taken in conjunction with the accompanying drawings.

BRIEF DESCRIPTION OF THE DRAWING

FIGS. 6 and 7 are views used for the explanation of the mode of operation of the exposure lamp control device.

DESCRIPTION OF THE PREFERRED EMBODIMENTS

Figure 1:
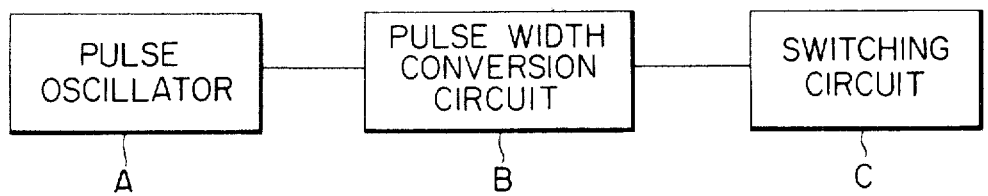
FIG. 1 is a block diagram illustrating the fundamental construction of an exposure lamp control device in accordance with the present invention.

Referring to FIG. 1 illustrating in block diagram the fundamental construction of an exposure lamp control device in accordance with the present invention, the pulse repetition rate of a pulse oscillator A is variable, as will be described in detail hereinafter, and in response to the pulse repetition rate of the output pulses from the pulse oscillator A, the pulse width of the output pulses of a pulse width conversion circuit B varies. The output of the pulse width conversion circuit B is applied to a switching circuit C in which a switching element is turned on and off in response to the pulse width of the input pulses, thereby controlling the on-off operation of an exposure lamp.

Figure 2:
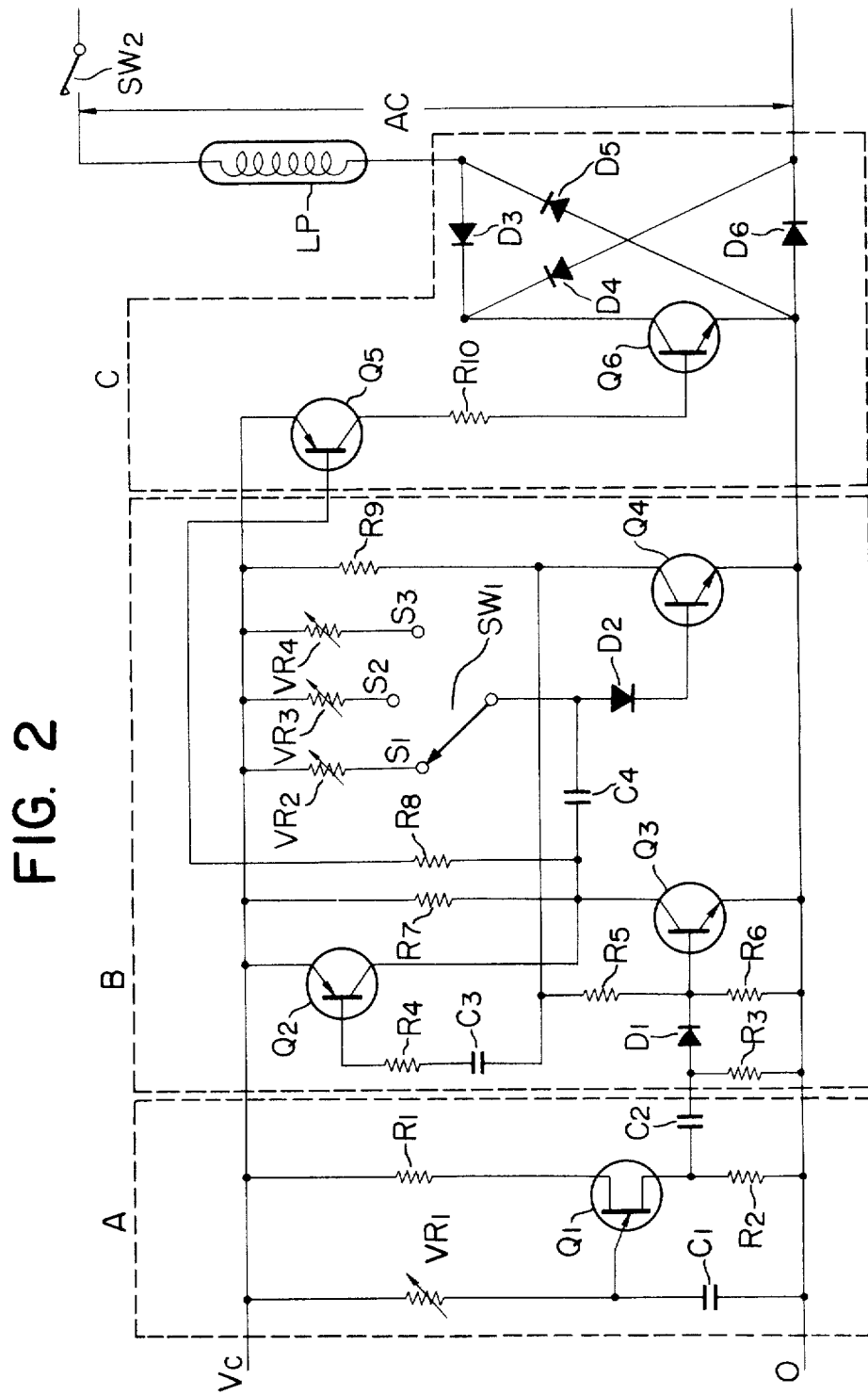
FIG. 2 is a circuit diagram of a first embodiment of the present invention.

Next referring to FIG. 2 illustrating the first embodiment of the present invention, the pulse oscillator A comprises a unijunction transistor Q1, a variable resistor VR1 and a capacitor C1, the pulse repetition rate being varied depending upon the values of the variable resistor VR1 and the capacitor C1. The pulse width conversion circuit B comprises a monostable multivibrator consisting of transistors Q2 and Q3. The pulse width may be varied as the selection switch SW1 selects a variable resistor VR2, VR3 or VR4. The output of the pulse width conversion circuit B is applied to the switching circuit C including a switching transistor Q6 which is coupled to an exposure lamp LP so as to control its on-off operation. The output pulses of the switching circuit C will be described in detail hereinafter. Even when the switch SW2 is closed, the lamp LP will not be turned on because the switching transistor Q6 is turned off and the diodes $D_3$ through $D_6$ are interconnected as shown.

The switching transistor Q6 is turned on for a time interval equal to the pulse width of the output pulse of the pulse width conversion circuit B which in turn is dependent upon the pulse repetition rate of the output of the pulse oscillator A. Therefore the exposure lamp LP is turned on for a time interval equal to the pulse width of the output pulse of the pulse width conversion circuit B. That is, the pulse width is varied for each separation negative.

Figure 3:
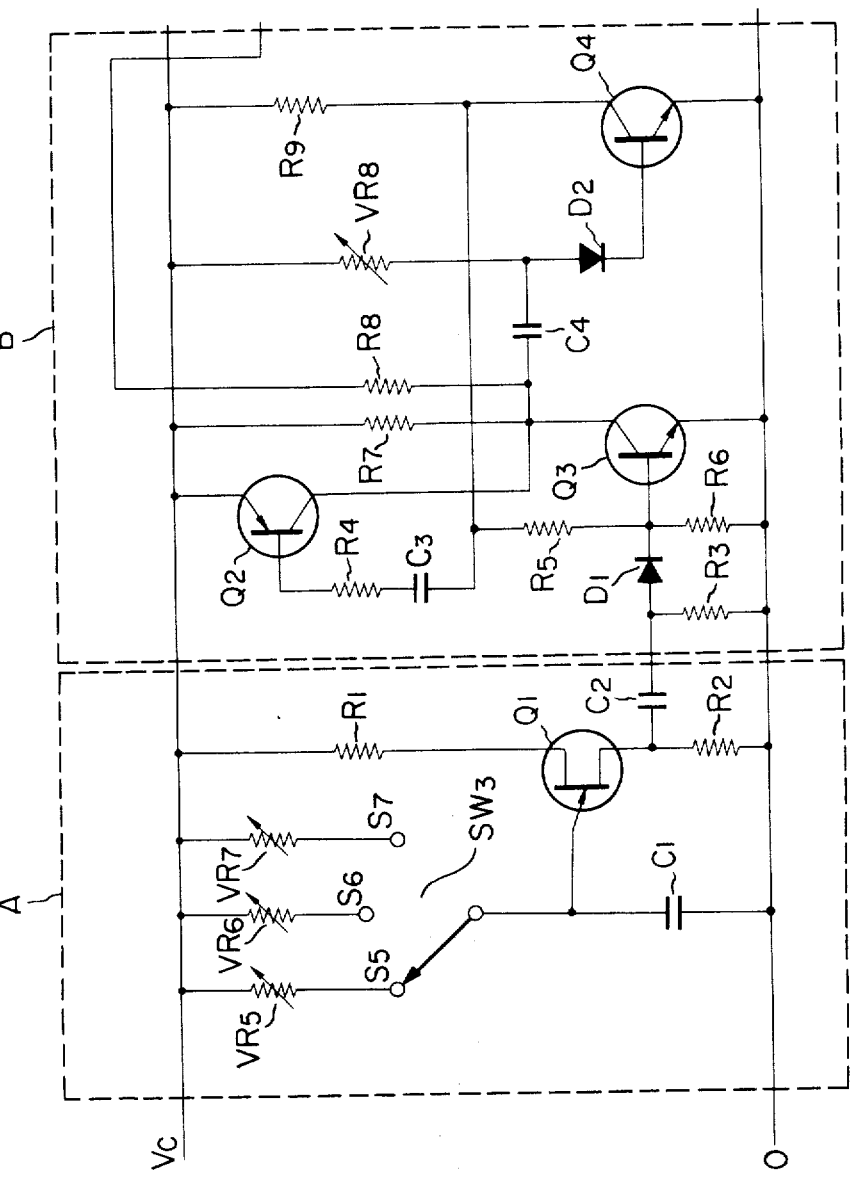
FIG. 3 is a circuit diagram of a second embodiment of the present invention.

In the second embodiment of the present invention shown in FIG. 3 the pulse repetition rate is varied for each separation negative. That is, the pulse oscillator A includes three variable resistors VR5, VR6 and VR7, one of which is selected by a selection switch SW3 depending upon the separation negative. Therefore, the pulse repetition rate may be varied to attain a proper color balance among a set of separations. The pulse width of the output pulse of the pulse width conversion circuit B may be varied by a variable resistor VR8.

Figure 4:
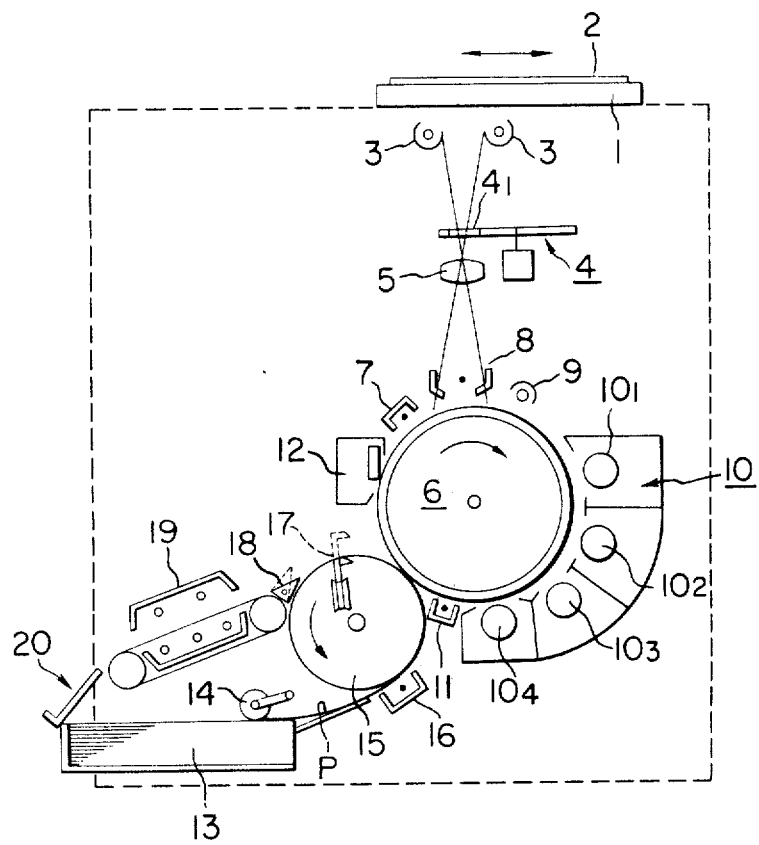
FIG. 4 is a schematic view of a color copying machine incorporating an exposure lamp control device in accordance with the present invention.

Next referring to FIG. 4, a slit exposure type color copying machine incorporating the exposure lamp control device in accordance with the present invention will be described. As an original holder 1, upon which is placed an original 2, is traversed, the original 2 is exposed through a slit by exposure lamps 3 and projected upon a sensitive drum 6 through a color filter assembly 4 and a projection lens system 5. Prior to the projection of the original 2, the surface of the sensitive drum 6 is charged by a charger 7 so that an electrostatic image of the original 2 may be formed. The electrostatic image is developed by a unit $10_1$ having a developing agent in a predetermined color in a developing assembly 10. In the instant copying machine, one of the units of the developing assembly 10 is selected automatically depending upon the color filter selected in the color filter assembly 4. However, these units may be so arranged as to be manually selected depending upon the reproduction in a desired color. The developed image is post-charged by a post charger 11, and thereafter transferred onto a recording medium P. After the image transfer, the remaining developing agent upon the surface of the sensitive drum 6 is wiped off by a cleaning device 12 so that the next image forming operation may be effected. The recording medium P is fed from a supply cassette 13 to a transfer roller 15 by a feed roller 14. The surface of the transfer roller 15 is electrostatically charged by a charger 16 so that the recording medium P may be attracted to the transfer roller 15. Alternatively, a clamping pawl 17 may be provided so that the recording medium P may be mechanically clamped around the transfer roller 15. After the image transfer, the recording medium P is separated by a separating pawl 18 from the transfer roller 15, and is discharged into a tray 20 through a fixing device 19.

Figure 5:
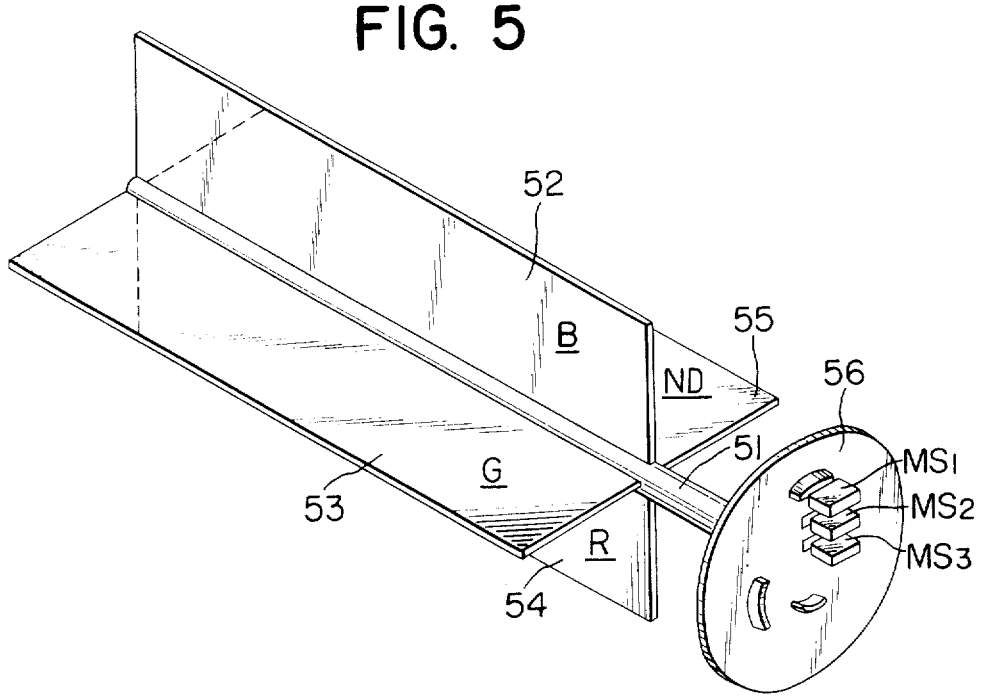
FIG. 5 is a perspective view of a color filter assembly thereof.
Figure 5A:
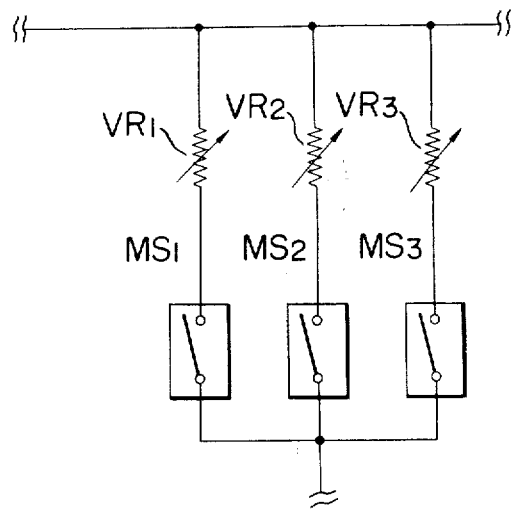
FIG. 5a is a view used for the explanation of the interconnection between the exposure lamp control device in accordance with the present invention and the color filter assembly shown in FIG. 5.

Next referring to FIG. 5, the color filter assembly 5 of the copying machine shown in FIG. 4 will be described in detail hereinafter. The color filter assembly comprises four rectangular color filters 52, 53, 54 and 55 attached at right angles with respect to each other to a rotary shaft 51. Cams are attached to a control dish 56 attached to one end of the rotary shaft 51 and actuate microswitches MS1, MS2 and MS3 depending upon a desired separation, that is, a color filter 52, 53, 54 or 55 in operative position. That is, the microswitches MS1, MS2 and MS3 are inserted in the pulse oscillator A or pulse width conversion circuit B as shown in FIG. 5a so that the pulse width or pulse repetition rate may be varied depending upon the color filter in operative position. It is to be understood that a relay or the like may be additionally inserted which may be actuated by the microswitches MS1, MS2 and MS3.

According to the present invention, the color balance among a set of separations may be optimized depending upon the characteristics of the color filters, the exposure lamps and the sensitive drum by adjusting the values of the variable resistors VR2, VR3 and VR4 in the monostable multivibrator or pulse width conversion circuit B shown in FIG. 2. The over-all exposure may be controlled by the variable resistor VR1.

Figure 6:
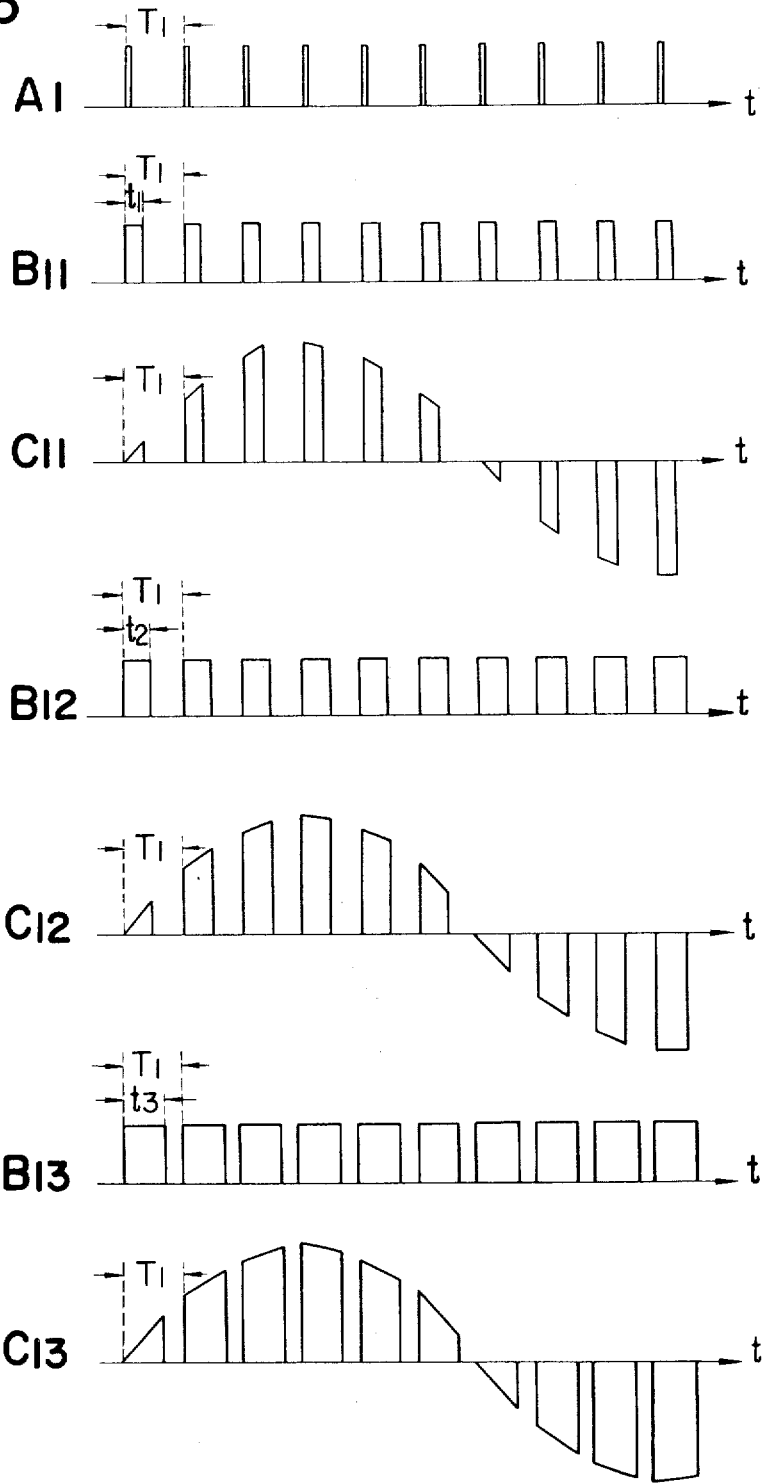

As shown at A1 in FIG. 6 the pulse repetition rate of the pulse oscillator is set to $1/T_1$. When the red color filter is used, the selection switch SW1 closes the fixed contact S1 so that the pulse width of the output pulse of the pulse width conversion circuit B becomes $t_1$ as shown at $B_{11}$ in FIG. 6. When the green filter is used, the fixed contact S2 is closed so that the pulse width changes to $t_2$ as shown at $B_{12}$ in FIG. 6. When the pulse filter is used, the fixed contact S3 is closed so that the pulse width changes to $t_3$ as shown at $B_{13}$ in FIG. 6. That is, when the original is reproduced in a first color, for instance, in red color, the pulse oscillator A oscillates at a pulse repetition rate as shown at A1 in FIG. 6, and the monostable multivibrator B generates the output pulses as shown at $B_{11}$ in FIG. 6. Therefore, the switching transistor Q6 is turned on for a time interval equal to the pulse width $t_1$ so that the pulse current as shown at $C_{11}$ in FIG. 6 flows into the exposure lamp LP. Upon completion of the exposure, the switch SW2 is opened so that the exposure lamp LP is turned off and so is the power source for the exposure lamp control device. When the reproduction of the original in a second color, for instance, in green color, the fixed contact S2 in the selection switch SW1 is closed so that the pulse width of the output pulse of the pulse width conversion circuit B changes to $t_2$ as shown at $B_{12}$ in FIG. 6. Consequently, the pulse current as shown at $C_{12}$ in FIG. 6 flows into the exposure lamp. When the reproduction of the original in a third color, for instance, in blue color, is started, the fixed contact S3 is closed so that the output of the monostable multivibrator B becomes as shown at $B_{13}$ in FIG. 6. As a result, the driving current as shown at $C_{13}$ in FIG. 6 flows into the exposure lamp. Thus the optimum exposure may be attained depending upon the separated color, that is a color filter used.

Even when the tone of the original is too dark or too thin, the image with the optimum tone may be reproduced by adjusting the pulse repetition rate $1/T$ of the pulse oscillator A. That is, when the pulse repetition rate is increased from $1/T$, the tone of the reproduced image may be made thinner. On the other hand, when the pulse repetition rate is decreased, the image with a darker tone may be obtained. For instance, when the original with a thin tone is reproduced, the control pulses as shown in FIG. 7 are obtained for respective separated colors so that the image with the optimum tone may be reproduced.

As described hereinbefore, the optimum exposure control may be attained by the exposure lamp control device in accordance with the present invention even when this device is incorporated in the slit exposure type copying machine. The exposure lamp control device in accordance with the present invention is simple in construction and operation, consumes less power, and ensured the correct and excellent color balance of the reproduced color image.

We claim:

1. A device for controlling an exposure lamp for exposing or projecting an original image comprising:
   a. a pulse oscillator means whose pulse repetition rate is variable,
   b. a pulse width conversion or changing means for changing the pulse width of the output pulses of said pulse oscillator means, and
   c. a switching means adapted to be turned on and off in response to the output pulses from said pulse width conversion or changing means.

2. In an exposure and projection system including color separating means for exposing and projecting an original image in different colors, an exposure lamp control device comprising:
   a. means for switching said color separating means depending upon a desired separation negative,
   b. pulse oscillator means comprising means for adjusting pulse repetition rate thereof to a desired value,
   c. pulse width conversion or changing means comprising means for adjusting the output pulse width thereof to a desired value in accordance with the pulse width of the output pulses from said pulse oscillator means, and
   d. switching means adapted to be turned on and off in response to the output pulses from said pulse width conversion or changing means, thereby controlling the on-off operation of an exposure lamp or lamps, 3. A device as defined in claim 2 wherein said pulse oscillator or generator means includes:
   a. a plurality of pulse repetition rate setting means corresponding to the number of desired separations for setting a pulse repetition rate depending upon a desired separation negative,
   b. means for selecting and switching said pulse repetition rate setting means, and
   c. means for operatively interconnecting said selecting and switching means and means for switching said color separating means depending upon a desired separation negative.

4. A device as defined in claim 2 wherein said pulse width conversion or changing means includes:
   a. a plurality of pulse width setting means corresponding to the number of desired separations for setting a pulse width depending upon a desired separation negative,
   b. means for selecting and switching said pulse width setting means, and
   c. means for operatively interconnecting said selecting and switching means and means for switching said color separating means depending upon a desired separation negative.

* * * * *